United States Patent
Gothait (12)

(10) Patent No.: US 6,259,962 B1
(45) Date of Patent: Jul. 10, 2001

(54) APPARATUS AND METHOD FOR THREE DIMENSIONAL MODEL PRINTING

(75) Inventor: Hanan Gothait, Rehovot (IL)

(73) Assignee: Objet Geometries Ltd., Rehovot (IL)

( * ) Notice: Subject to any disclaimer, the term of this patent is extended or adjusted under 35 U.S.C. 154(b) by 0 days.

(21) Appl. No.: 09/259,323

(22) Filed: May 3, 1999

(51) Int. Cl.$^7$ .................................................. G06F 19/00
(52) U.S. Cl. ............................ 700/119; 700/118; 700/182
(58) Field of Search ............................ 700/98, 120, 103, 700/118, 119, 182; 156/158; 425/379.1

(56) References Cited

U.S. PATENT DOCUMENTS

| | | | |
|---|---|---|---|
| 4,575,330 | * | 3/1986 | Hull .................................. 425/174.4 |
| 5,204,055 | * | 4/1993 | Sachs et al. .............................. 419/2 |
| 5,287,435 | | 2/1994 | Cohen et al. . |
| 5,340,433 | * | 8/1994 | Crump .................................. 156/578 |
| 5,387,380 | | 2/1995 | Cima et al. . |
| 5,594,652 | * | 1/1997 | Penn et al. ...................... 364/468.26 |
| 5,717,599 | | 2/1998 | Menhennett et al. . |
| 5,784,279 | | 7/1998 | Barlage, III et al. . |
| 5,902,537 | * | 5/1999 | Almquist et al. ..................... 264/401 |
| 6,030,199 | * | 2/2000 | Tseng .................................... 425/132 |

FOREIGN PATENT DOCUMENTS

WO 97/31781    9/1997  (WO) .

OTHER PUBLICATIONS

*Three Dimensional Printing: What is 3DP?*, see http://web.mit.edu/afs/athena/org/t/tdp/www.

Z Corporation, News Release, "Z Corp. Debuts Robust New Materials System", Apr. 2, 1998.

* cited by examiner

*Primary Examiner*—William Grant
*Assistant Examiner*—Kidest Bahta
(74) *Attorney, Agent, or Firm*—Eitan, Pearl, Latzer & Cohen-Zedek

(57) ABSTRACT

Apparatus and a method for three-dimensional printing of a three-dimensional model is provided. The apparatus includes a printing head having a plurality of nozzles, a dispenser connected to the printing head for selectively dispensing interface material in layers and curing means for optionally curing each of the layers deposited. The depth of each deposited layer is controllable by selectively adjusting the output from each of the plurality of nozzles.

8 Claims, 10 Drawing Sheets

APPARATUS AND METHOD FOR THREE DIMENSIONAL MODEL PRINTING

FIELD OF THE INVENTION

The present invention relates to three-dimensional modeling in general and to apparatus for controlling the build up of layers during three-dimensional printing.

BACKGROUND OF THE INVENTION

Three-dimensional (3-D) printing, which works by building parts in layers, is a process used for the building up of three-dimensional models. 3-D printing is relatively speedy and flexible allowing for the production of prototype parts and tooling directly from a CAD model, for example.

Using 3-D printing enables the manufacturer to obtain a full 3-D model of any proposed product before tooling thereby possibly substantially reducing the cost of tooling and leading to a better synchronization between design and manufacturing. A lower product cost and improved product quality can also be obtained.

Various systems have been developed for computerized three-dimensional printing. Known systems include a system developed by 3D Systems Inc. of California, USA, which operates on the basis of stereo-lithography wherein a focused ultra-violet laser is scanned over the top of a bath of photopolymerizable liquid polymer plastic material. The surface of the bath is polymerized on contact with the UV laser creating a solid plastic layer at or just below the surface.

U.S. Pat. No. 5,387,380 to Cima et al. describes a technique for providing layered parts by depositing a layer of powder material and then depositing a binder material in selected regions to produce a layer of bonded powder material at the selected regions. These steps are repeated for successive layers to form a desired component. Following heat treatment, unbound powder is removed, leaving the fabricated part.

U.S. Par. No. 5,287,435 to Cohen et al describes apparatus for producing three-dimensional models which includes apparatus for depositing layer-by-layer, a photopolymer material in a selectable configuration and apparatus for curing each layer prior to deposition of the succeeding layer.

A disadvantage of this system is that it is difficult to achieve a flat uniform surface for each layer. U.S. Pat. No. 5,287,435 utilizes a machining unit for trimming the surface of each layer to remove excessive thickness.

In standard two-dimensional printing, the ink jet printer prints parallel ink dot lines on a substrate by displacing its print head relative to a substrate in one direction during the actuation of its ink jet heads.

In order to print an image of a desired line resolution, each ink jet head is required to print a number of ink dot lines equal to the ratio between the separation gap between ink jet heads and the desired line resolution. In practice, this is achieved by intermittently advancing the print head relative to a substrate in a second direction perpendicular to the first direction through one or more steps and actuating the ink jet nozzles at each of their new positions whilst displacing the print head relative to a substrate in the first direction. Unfortunately, if one or more nozzles are blocked, the image will be imperfect, having unprinted bands.

Patent WO 97/31781 assigned to Idanit Technologies Ltd of Israel describes a method for operating an ink-jet printer, having a linear row of nozzles, which displaces the print head relative to the substrate in a direction which is transverse to the line being printed and repeating the printing steps. This method reduces the visual effect of an unprinted band due to a blocked nozzle by the displacement of the print head but does not compensate for the blocked nozzle completely.

SUMMARY OF THE INVENTION

The present invention provides a 3-D printing system for constructing 3-D models using a printing head having at least one row of ink-jet nozzles for ejecting interface material.

It is a further object of the invention to provide a method of printing 3-D models which is unaffected by the blockage of any of the nozzles.

It is a yet further object of the invention to provide a system and method for compensating for over and under deposition from any of the nozzles.

There is thus provided, in accordance with a preferred embodiment of the present invention, apparatus for three-dimensional printing of a three-dimensional model. The apparatus includes a printing head having a plurality of nozzles, a dispenser connected to the printing head for selectively dispensing interface material in layers and curing means for optionally curing each of the layers deposited. The depth of each deposited layer is controllable by selectively adjusting the output from each of the plurality of nozzles.

Furthermore, in accordance with a preferred embodiment of the present invention, the control means includes a dispenser connected to the printing head, a process controller coupled to the printing head and a Computer Aided Design (CAD) system coupled to the process controller.

Furthermore, in accordance with a preferred embodiment of the present invention, the plurality of nozzles includes an array of nozzles.

In addition, in accordance with a preferred embodiment of the present invention, the apparatus further includes positioning apparatus coupled to the process controller for selectively positioning the printing head by commands from the process controller.

Furthermore, in accordance with a preferred embodiment of the present invention, the interface material is a photopolymer material curable by the application of ultra-violet or infra red radiation.

In addition, in accordance with a preferred embodiment of the present invention, the apparatus further includes a reference sensor coupled to the process controller, sensor positioning apparatus coupled to the process controller for positioning the sensor; and means for calculating the variation in the height of the deposited layer from each of the nozzles.

There is thus provided, in accordance with a preferred embodiment of the present invention, a method for three-dimensional printing of a three-dimensional model. The method includes the steps of:

positioning a printing head to a first pre-selected position, the printing head having a plurality of nozzles along a longitudinal axis;

selectively dispensing interface material in layers from the printing head;

re-positioning the printing head to a second pre-selected position; and repeating the step of selective dispensing.

The second pre-selected position is displaced axially along the longitudinal axis from the first pre-selected position.

In addition, in accordance with a preferred embodiment of the present invention, the method further includes the step of:

selectively adjusting the output from each of the plurality of ink-jet nozzles to control the amount of the interface material dispensed from each of the plurality of nozzles.

In addition, in accordance with a preferred embodiment of the present invention, the interface material is a photopolymer material and the method further includes the step of curing the deposited layers by the application of ultra-violet radiation or infra red radiation.

The method further includes the step of calibrating the nozzles.

Furthermore, in accordance with a preferred embodiment of the present invention, the step of calibrating includes the steps of:

depositing a single layer by selectively dispensing interface material from all of the nozzles;

comparing the height of the deposit from each of the nozzles with a reference level;

calculating the variation from the reference level; and adjusting the dispensing of the interface material from each of the nozzles.

Furthermore, in accordance with a preferred embodiment of the present invention, the method further includes the step of compensating for a variation in each of the layers prior to depositing the succeeding layer.

In addition, the step of compensating includes the steps of:

comparing the height of the last deposited layer with a reference level;

calculating the variation from the reference level;

adjusting the dispensing of the interface material from each of the nozzles.

Additionally, in accordance with a preferred embodiment of the present invention, the step of comparing includes the step of:

building up a reference wall by selectively dispensing interface material from all of the nozzles, the reference wall including a plurality of reference layers, each of the plurality of reference layers being deposited in the process of depositing the corresponding model layers.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
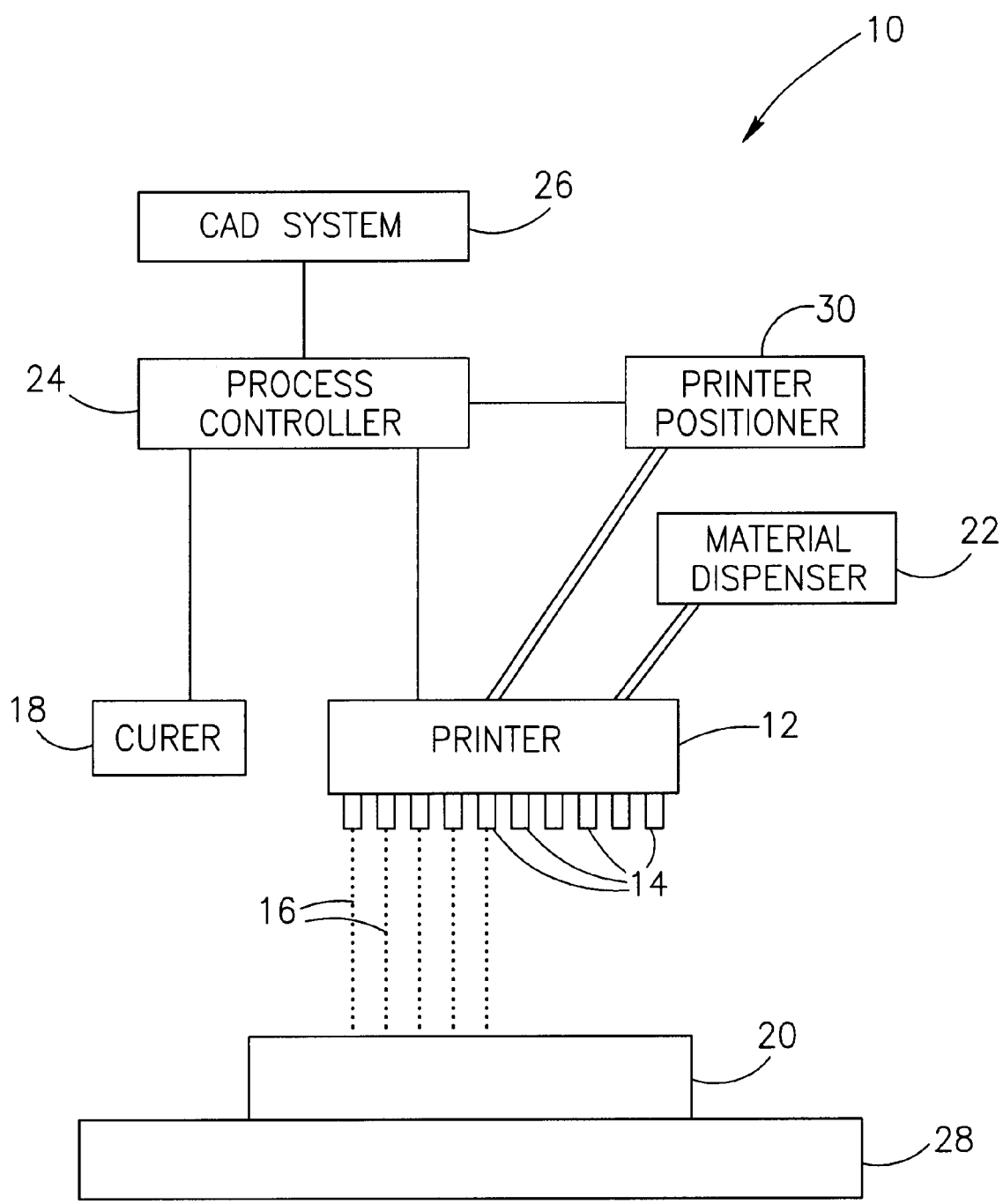
FIG. 1 is a schematic illustration of a 3-D printing system, constructed and operative in accordance with a preferred embodiment of the present invention.

Reference is made to FIG. 1, which is a schematic illustration of a 3-D printing system, generally designated 10, constructed and operative in accordance with a preferred embodiment of the present invention.

3-D printing system 10 comprises a printing head 12 having a plurality of ink-jet nozzles 14, through which interface material 16 is jelled and a curing unit 18 for curing the interface material 16 to form the 3-D component, referenced 20, being designed. The interface material 16 is preferably a photopolymer, such as DI 7090 Clear Coat, manufactured by Marabuwerke Gmbh & Co., Tamm, Germany. Preferably, the photopolymer contains ultra violet (UV) or infra red (IR) curable material. For example, material based on reactive acrylates is suitable for UV curing or hardening by the application of UV radiation from curing unit 18. The 3-D component 20 is build up in layers, the depth of each layer being controllable by selectively adjusting the output from each of the plurality of ink-jet nozzles 14.

It should be understood that the term "ink-jet nozzles" is used in the context of this application for convenience to include nozzles similar to ink-jet nozzles, known in the art, but is not restricted to nozzles for ejecting ink and also includes nozzles for ejecting interface material for the building of 3-D models.

The 3-D printing systems 10 further comprises a dispenser 22, a process controller 24 and a Computer Aided Design (CAD) system 26. The process controller 24 is coupled to CAD system 26, curing unit 18 and printing head 12.

The dispenser 22, which contains interface material 16, is suitably connected to printing head 12.

Preferably, the 3-D component 20 is formed on a support surface 28, which can be selectively positioned in the X- and Y-axes by positioning apparatus (not shown).

Figure 2:
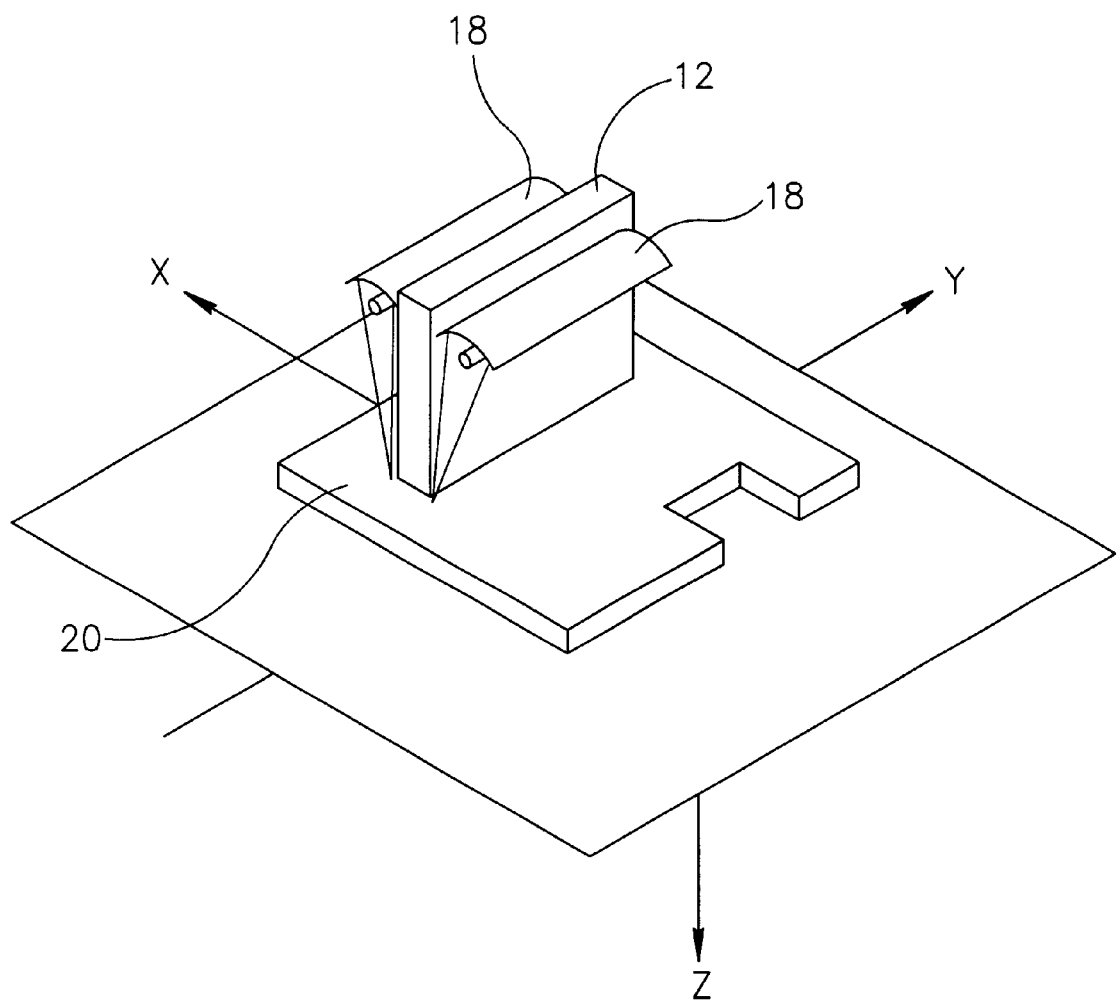
FIG. 2 is a schematic isometric illustration of the printing and curing of a 3-D model of FIG. 1.

FIG. 2 is a schematic isometric illustration of the printing and curing of model 20. In this embodiment, a pair of curing units 18 are located either side of printing head 12.

The quality and consistency of each layer is dependent on the quality of the printing which is in turn dependent on the number and spacing of the plurality of ink-jet nozzles 14. In a preferred embodiment, printing head 12 comprises at least one row of nozzles 14.

Figure 3A:
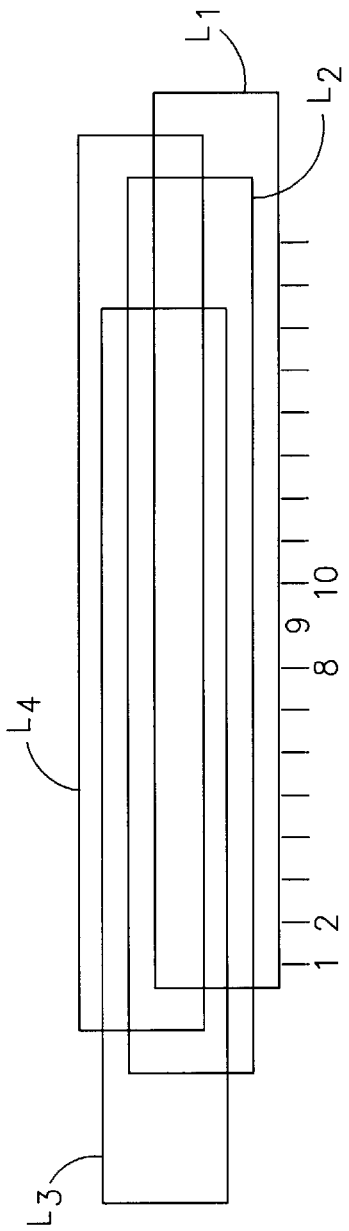
FIG. 3A is an elevational schematic view of a printing head utilized with the 3-D printing system of FIG. 1.
Figure 3B:
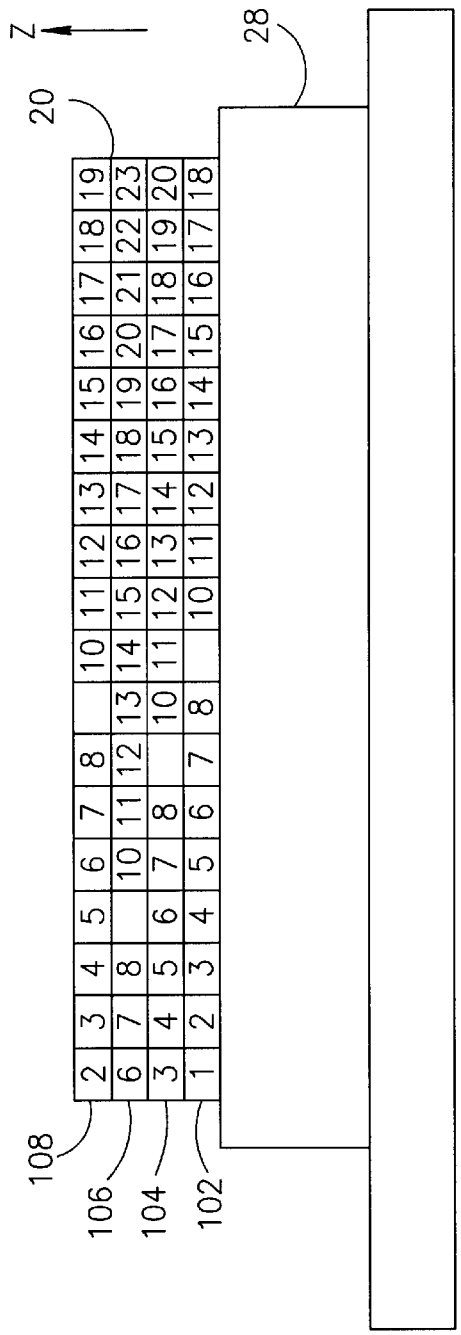
FIG. 3B is an elevational view of part of a 3-dimensional object produced by printing head of FIG. 3A.

Reference is now made to FIGS. 3A and 3B. FIG. 3A is an elevational schematic view of a printing head 12 having a single row of nozzles 14, numbered 1, 2, etc. FIG. 3B is an elevational view of part of a 3-dimensional object produced by printing head 12 of FIG. 3A.

With the printing head 12 aligned as shown by the outline, referenced L1, ink-jet nozzles 1–18 are actuated to deposit interface material (row 102), nozzle 1 is at the leftmost position. The thickness of a single pass of the printing head 12 is approximately 10μ. As shown in FIG. 3B, all the nozzles except for nozzle 9 (which may be blocked, for example) have deposited material. The places which received material are shown by their number and the missing nozzle 9 is shown as blank. In order to overcome the deficiency of a blocked nozzle, printing head 12 is offset during the next pass so that the position of nozzle 9 is covered by another nozzle. For example, referring back to FIG. 3A, the printing head 12 is offset two spaces to the left (outline position L2) so that now nozzle 3 is at the leftmost position, located directly above the position previously taken by nozzle 1. Again, 18 nozzles (numbered 3–21) are actuated. The deficient nozzle 9 does not deposit ink, but this time, the blank spot is above the previously inked spot 7 (row 104).

This process can be repeated for each pass of the ink-jet nozzles, by randomly offsetting the printing head 12. For example, the printing head 12 is offset to position L3 so that nozzle 6 is now at the leftmost position (row 106) and then offset to position L4 so that nozzle 2 is now at the leftmost position (row 108). In this way, any deficiency in one or more nozzles can be compensated for without affecting the outcome of the layer.

Figure 4:
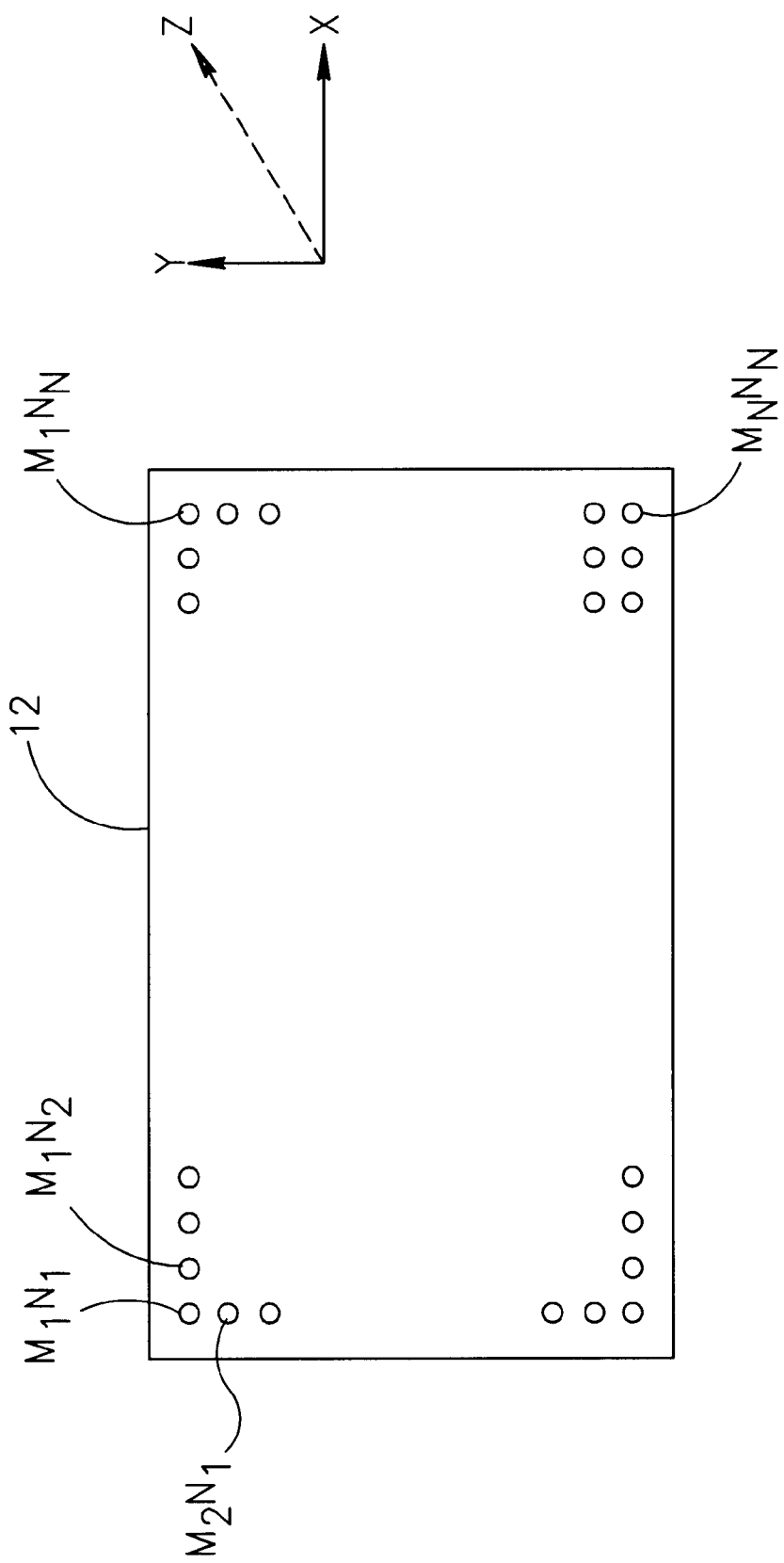
FIG. 4 is a detail of an alternative embodiment of a printing head, having a matrix of nozzles, utilized with the 3-D printing system of FIG. 1.

In an alternative preferred embodiment, printing head 12 (shown in FIG. 4) comprises a matrix of nozzles, having m rows and n columns. The nozzles are referenced $M_1N_1$ (from the top left) to $M_nN_n$ to the bottom right of the matrix. An example printing head suitable for 3-D printing contains a matrix of 36×12 nozzles.

The printing head 12, which is connected to a second positioning apparatus 30 (FIG. 1) may be selectively positioned in the X- and Y-axes by commands from the process controller 24.

Figure 5A:
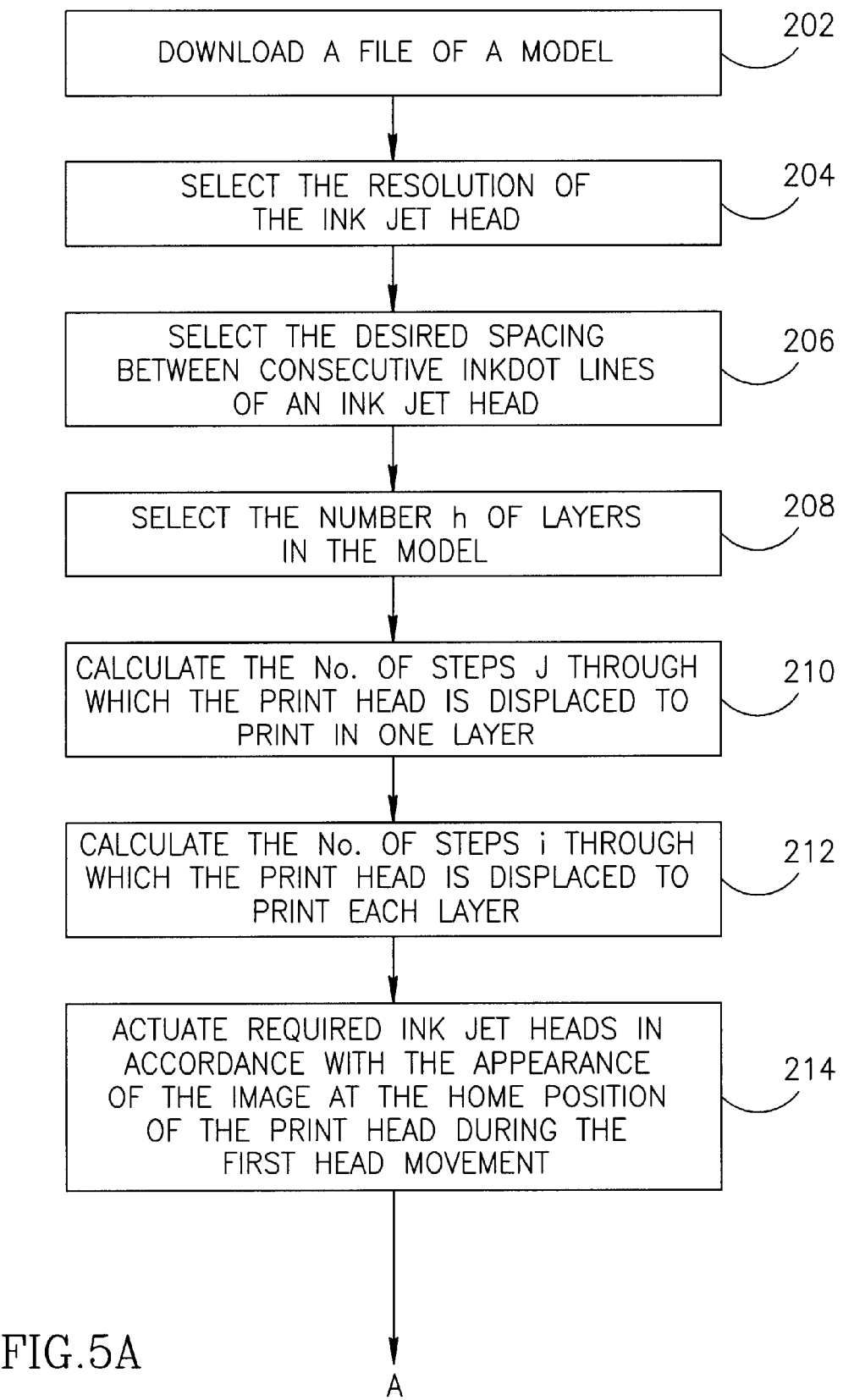
FIGS. 5A and 5B together form a flow chart diagram illustration of the build-up of a 3-D model of FIG. 1.
Figure 5B:
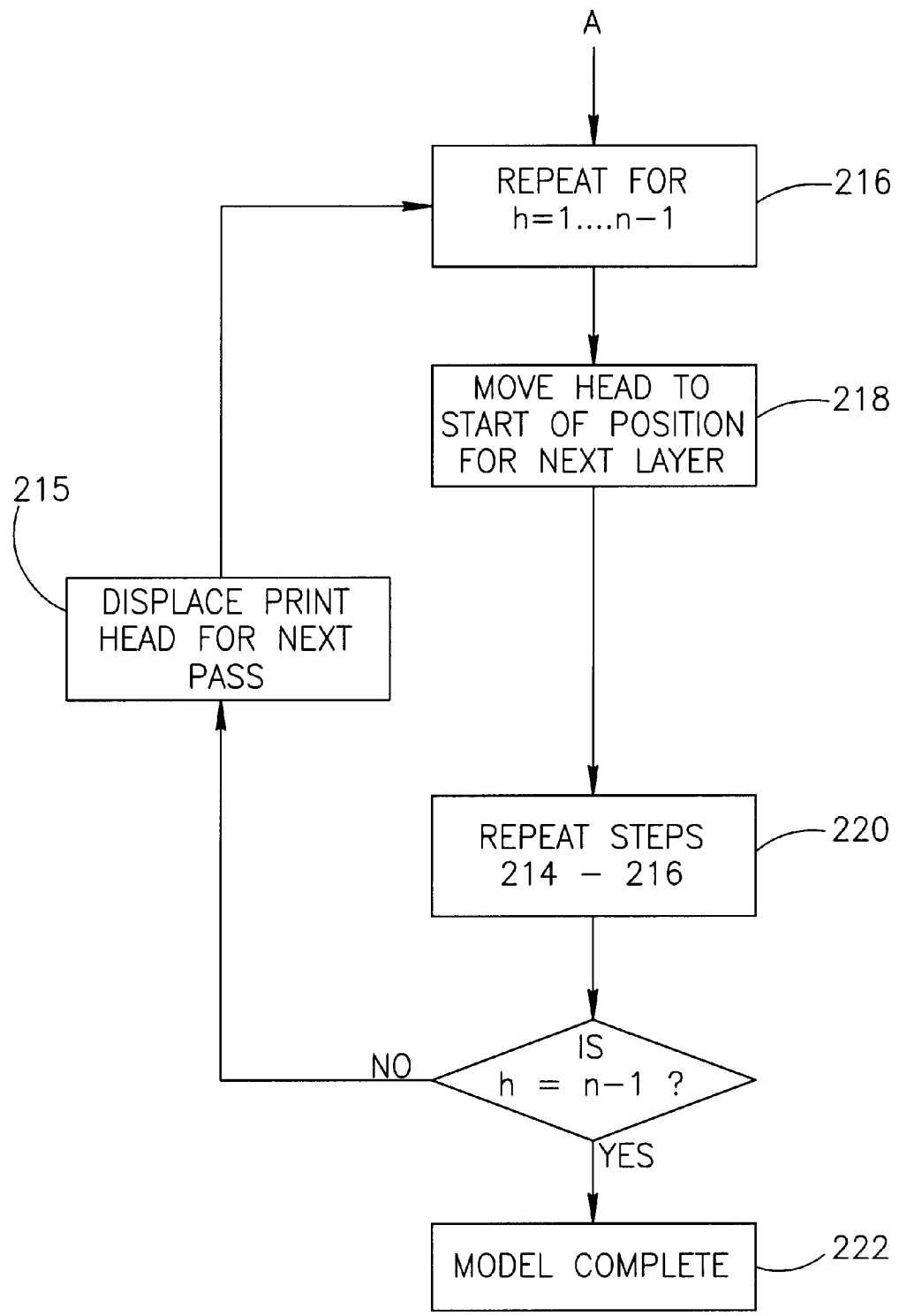

Reference is made FIG. 5 which is a flow chart diagram illustrating the build-up of a 3-D component 20 using a print head having a matrix of nozzles 14. A file of the model to be produced is downloaded to the CAD system 26 (step 202) allowing the operator to view the model and control the operational procedure.

There are several variable, selectable by the operator, which define the finished product. Firstly, the desired resolution of the jet head is selected by the operator (step 204). One of the factors influencing the choice of printer head configurations is the desired line quality, which is defined by the number of dots per inch (dpi). A typical industrial standard for line quality is 240–720 dpi. This factor may be increased or decreased depending on the model being produced and is restricted only by the capability of the printhead. Typical tolerances for 3-D printing of a 10 cm model, for example, is 100μ.

The operator can also select the desired spacing between consecutive ink-dot lines (step 206) and the number (h) of layers to be used in building up the model (step 208).

Then, the number of steps (i) through which the printing head 12 is displaced (in the x-y axes) to print a single layer (step 210) is calculated and the number of vertical steps (i), in the z-axis, to print the model is calculated (step 212).

The printing head 12 is positioned at its start position for the first layer and the ink-jet nozzles 14 which are required are actuated to print the first layer (step 214).

The printing head 12 is then displaced as calculated (step 210) and step 214 is then repeated for each displacement step (i) (step 216).

After completing a layer, the printing head 12 is then moved back to the start position for the next layer and repositioned in the vertical (z-axis) above the first layer (step 218). Since the thickness of a layer is approximately 10μ, it is not essential to reposition the printing head relative to the model after every layer, but this step may be deferred at the discretion of the operator.

Steps 214 and 216 are then repeated for subsequent layer (step 220). Steps 218 and 220 are repeated for each subsequent layer until the model is complete (step 222). The printhead is displaced (step 215) after each pass until the layer is complete. For each layer, only the ink-jet nozzles 14 required to print that particular layer are actuated.

The repositioning of the printing head 12 is carried out by positioning the second positioning apparatus 30 using the process controller 24.

Curing is preferably carried out after the deposition of each layer. However, alternatively, curing may be optionally deferred so that curing occurs after the deposition of more than one layer.

Figure 6:
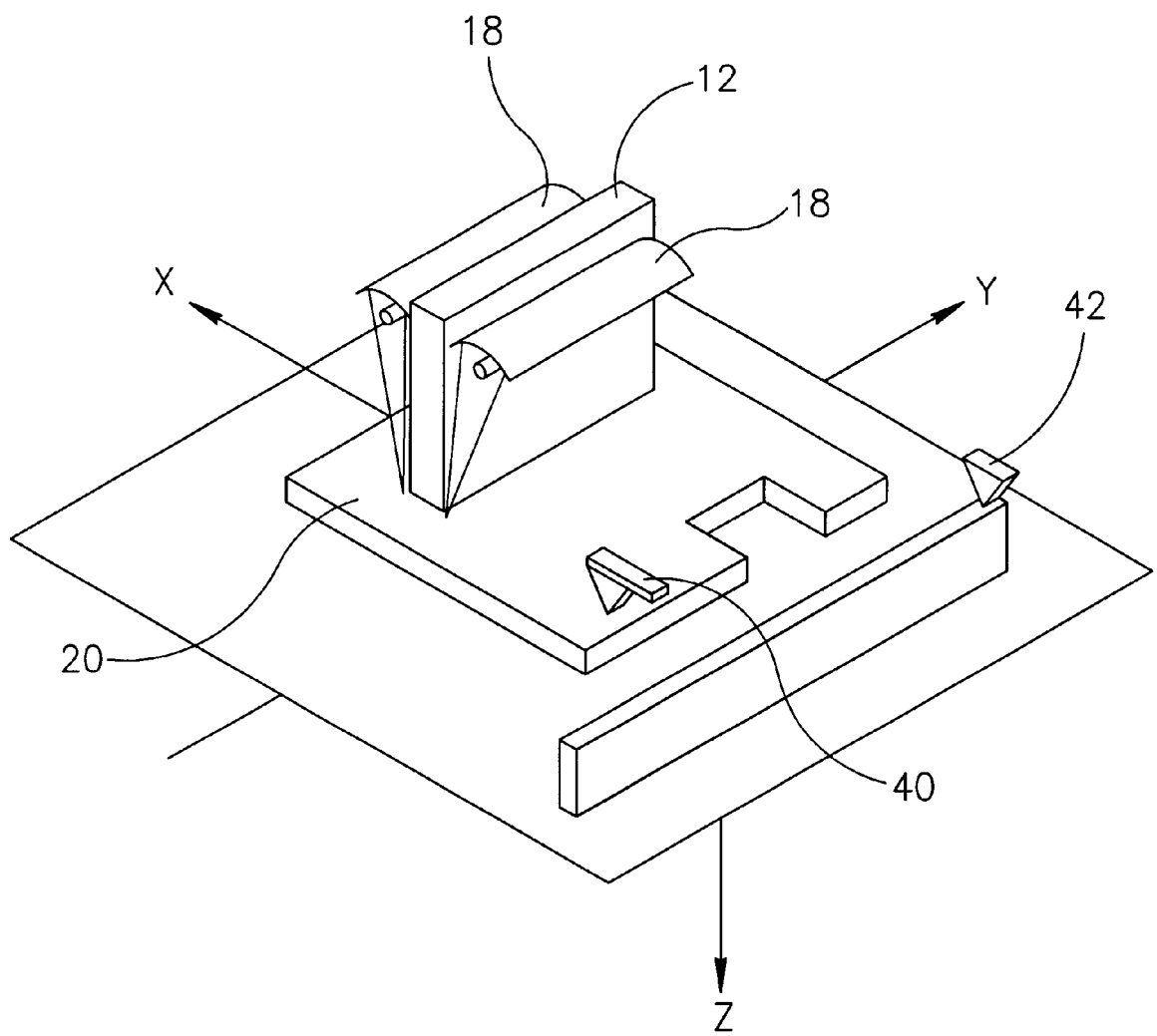
FIG. 6, is a schematic isometric illustration of a further preferred embodiment of a 3-D printing system.

Reference is now made to FIG. 6, which is a schematic isometric illustration of a further preferred embodiment of the production of 3-D model 20. In this embodiment, the 3-D printing system further comprises a model sensor 40 and a reference sensor 42 coupled to the process controller 24. The sensors 40 and 42 are connected to sensor positioning apparatus (not shown) which is capable of positioning the sensors 40 and 42 as directed by the operator of the 3-D printing system.

Figure 7A:
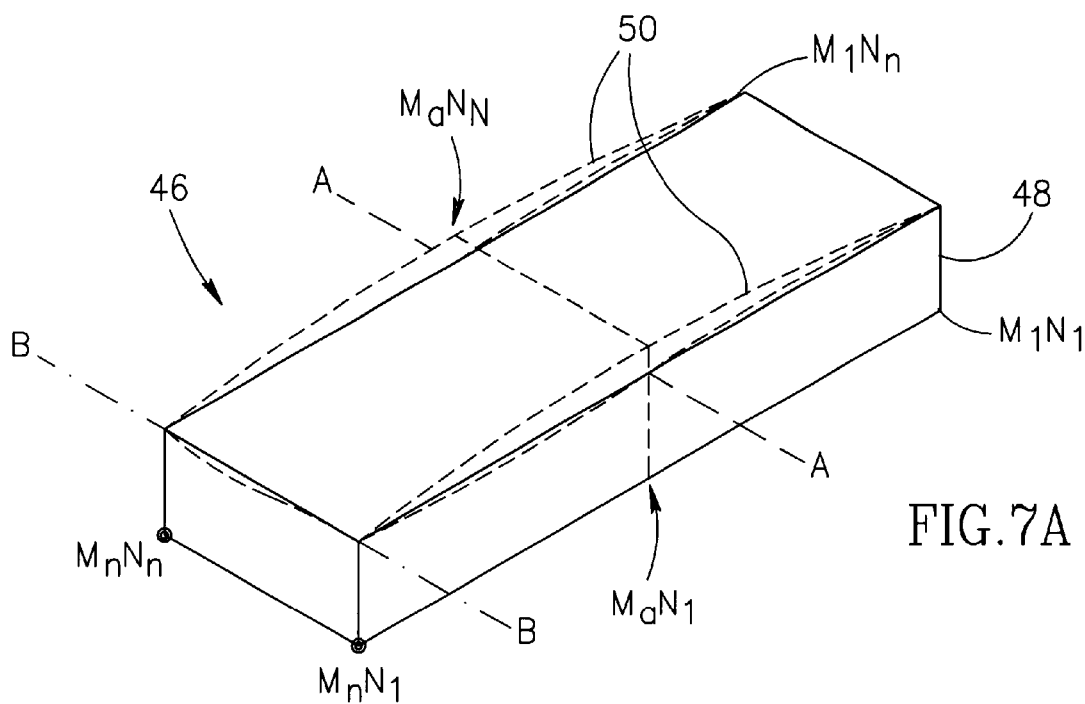
FIGS. 7A, 7B and 7C are enlarged cross-sectional illustrations illustrating a layer of a reference wall built by the 3-D printing system of FIG. 6.
Figure 7B:
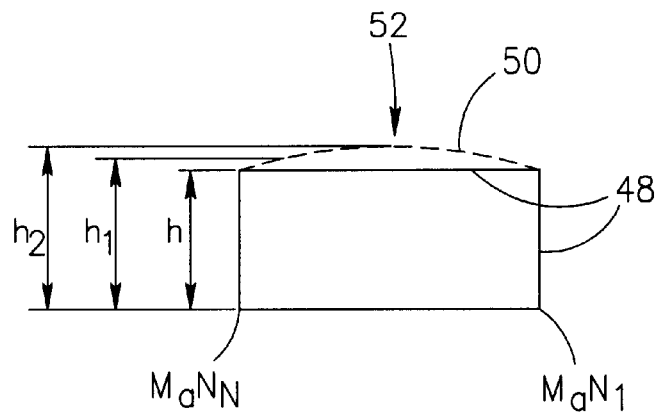
Figure 7C:
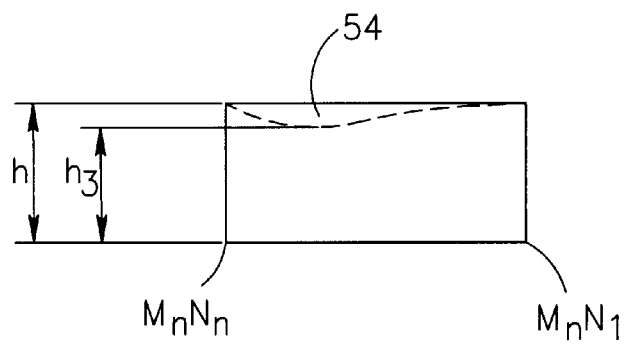

In this embodiment, a reference wall, designated 44, is build layer-by-layer in parallel with and adjacent the building of the 3-D model 20. The reference wall 44 is built up along the "Y"-axis, its width along the "X"-axis being the width of the printing head 12, that is, having a matrix of nozzles (along a single axis). Thus, each layer is copied in the reference wall 44. Similarly, where the printing head 12 comprises a two-dimensional matrix, the width of the reference wall includes a matrix of nozzles along both X and Y axes. Reference is now made to FIGS. 7A–7C, which are enlarged cross-sectional illustrations showing different examples of a single layer of reference wall 44. FIG. 7B illustrates the case where there is an extra build up of material and FIG. 7C illustrates the case where there is an insufficiency of material deposited.

The correct dimensions of the layer, referenced 46, are indicated by full lines 48. Layer 46 is shown, for exemplary purposes only, as a rectangular layer. The dimensions of layer 46 are indicated by the matrix of nozzles forming the printing head 12. The corners of layer 46 are referenced from $M_1N_1$ to $M_nN_n$, as shown in FIG. 3.

The dashed lines 50 represent the layer as printed, giving a generally concave appearance. A slice, that is a cross-section taken at a point A (say $M_{17}N_1$) indicated by coordinates $M_aN_1$-$M_aN_n$, is shown in FIG. 7B.

After the building of a layer, reference sensor 42 is positioned on top of the layer 46 and readings are taken on top of the layer 46 for each nozzle position. The readings are then compared with the actual model. For example, layer 46 being rectangular should have a height h. At one corner ($M_{17}N_n$), the height of layer is h1, which is higher than h. The highest point, reference 52 (say ($M_{17}N_{12}$), has a height h2.+

A cross-section taken along B—B at the edge of the layer, indicated by coordinates $M_nN_1$-$M_nN_n$, is shown in FIG. 7C. A depression 54 (say nozzle M=36,N=18), indicating a lack of material deposited, has a height h3 instead of h.

In the known prior art, such as U.S. Pat. No. 5,287,435 (described above), excessive layer thickness is trimmed by a machine prior to laying of the succeeding layer. It is a feature of the invention that the step of trimming a layer prior to printing the next layer is not necessary. Instead, utilizing the data recorded by the reference sensor 42 for each nozzle, adjustments can be made to the individual nozzles of the printing head 12 to compensate for the deposition of excessive material (FIG. 7B) or insufficient material (FIG. 7C).

Figure 8:
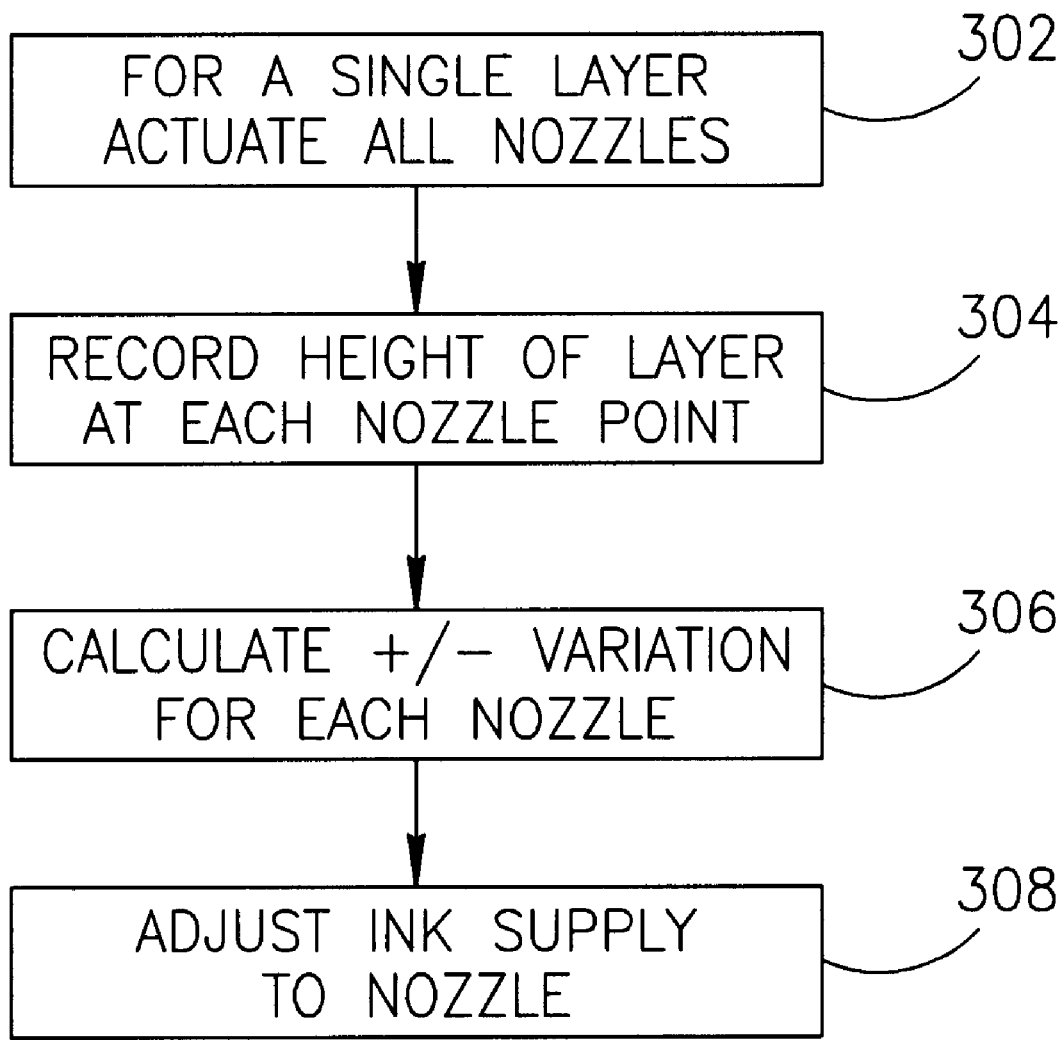
FIG. 8 is a flow chart diagram illustration of the calibration of the matrix of nozzles of the printing head of build-up of 3-D printing system of FIG. 6.

The reference wall 44 may be used for calibrating the nozzles of the printing head 12 and for on-line operational and correction control. Reference is now also made to FIG. 8, which is a flow chart illustration of the calibration of the matrix of nozzles of the printing head 12. To calibrate the nozzles, a test layer for the full matrix of nozzles is deposited (step 302) and the height of the layer at each nozzle point is measured (step 304) utilizing the reference sensor 42. For each nozzle, the variation from the reference is calculated (step 306). An adjustment (by calculating the plus/minus compensation due to each nozzle) is then made to the dispenser of those nozzles to compensate for any over/under depositing (step 308).

After the nozzles have been calibrated, the reference wall 44 is used for on-line operational and correction control during the build-up of a 3-D component 20 (described hereinabove with reference to FIG. 5). The production of the model is controllable by the operator.

Figure 9:
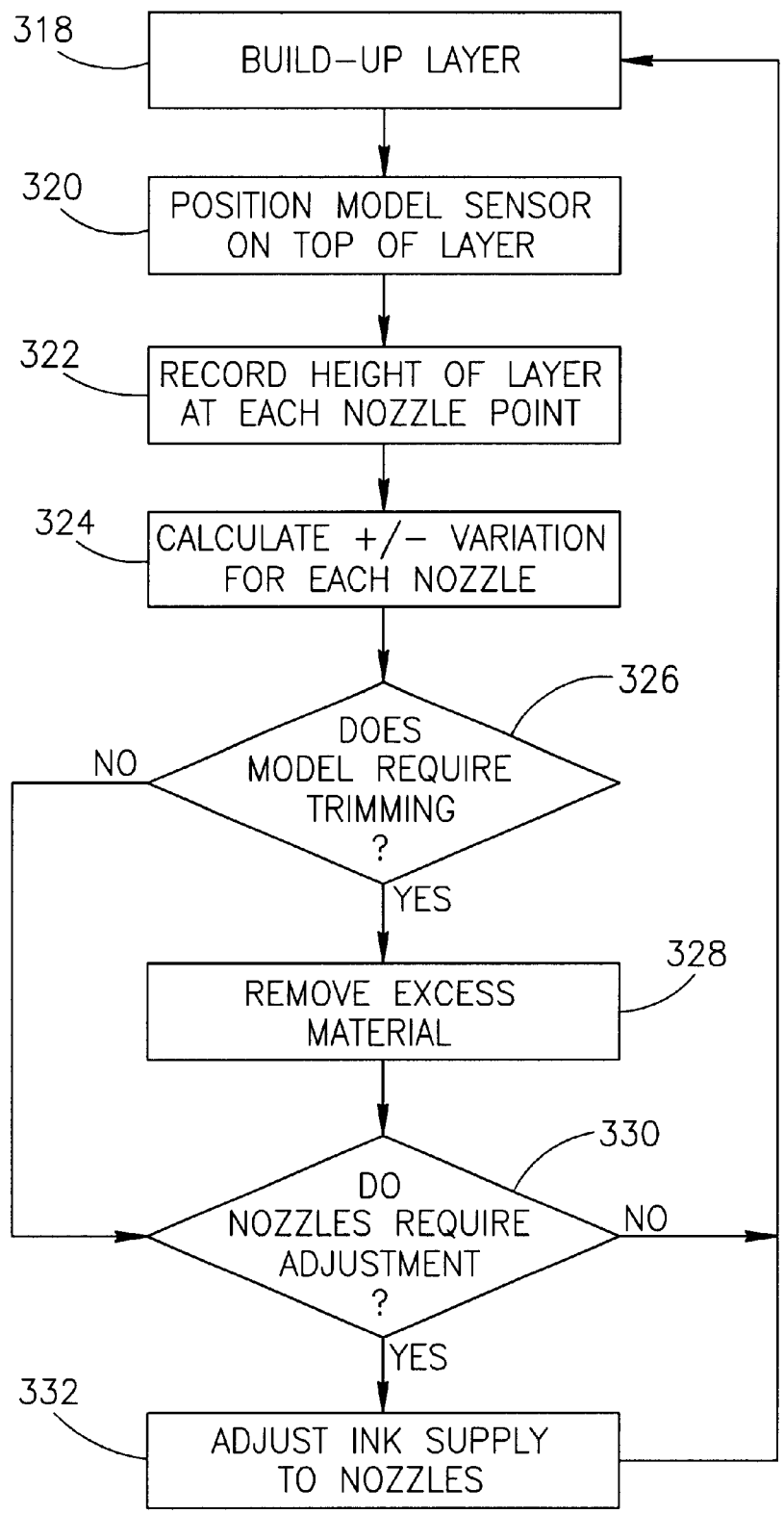
FIG. 9 is a flow chart diagram illustration of the on-line operational control of the 3-D model of FIG. 6.

Reference is now made to FIG. 9, which is a flow chart illustration of the on-line operational control of the 3-D model building. After each layer is build up (step 318), model sensor 40 is positioned on top of the layer (step 320) and the contours of the layer are checked (step 322) by taking readings on top of the layer for each nozzle position. For each nozzle, the variation from the reference is calculated (step 324).

A decision is then made whether to trim the layer (query box 326). In contrast to prior art modeling, trimming is not required after each layer, but is an option available to the operator. If trimming is selected, excess material is removed by a suitable trimming device (step 328).

If any of the nozzles are incorrectly dispensing ink (query box 330), an adjustment is made to the dispenser of those nozzles to compensate for any over/under depositing (step 332).

The next layer is then dispensed and the above steps (318–332) repeated as necessary.

It will be appreciated that the present invention is not limited by what has been described hereinabove and that numerous modifications, all of which fall within the scope of the present invention, exist. Rather the scope of the invention is defined by the claims, which follow:

What is claimed is:

1. A method for three-dimensional printing of a three-dimensional model utilizing a printing head having a plurality of nozzles along a longitudinal axis, the method comprising the steps of:

positioning the printing head to a first pre-selected position;

selectively dispensing interface material in a first layer from said printing head;

re-positioning said printing head to compensate for blocked nozzles to a subsequent position, said subsequent position being offset a distance of at least one nozzle along said longitudinal axis from said first pre-selected position and being a vertical distance above said first layer, said vertical distance being equal to the thickness of a subsequent layer of dispensing material;

repeating said step of selective dispensing in the subsequent layer; and repeating said steps of re-positioning and selective dispensing in the subsequent layer until the three-dimensional model is completed.

2. A method according to claim 1, and further comprising the step of:

selectively adjusting the output from each of said plurality of ink-jet nozzles during each dispensing step to control the amount of said interface material dispensed from each of said plurality of nozzles, thereby to control the thickness of each layer.

3. A method according to claim 1, wherein said interface material is a photopolymer material and further comprising the step of curing said deposited layers by the application of ultra-violet radiation of infra red radiation.

4. A method according to claim 1, further comprising the step of:

calibrating said plurality of nozzles.

5. A method according to claim 4, wherein said step of calibrating comprises the steps of:

depositing a single layer by selectively dispensing interface material from all of said plurality of nozzles;

comparing the height of the deposit from each of said plurality of nozzles with a reference level;

calculating the variation from said reference level; and adjusting the dispensing of said interface material from each of said plurality of nozzles.

6. A method according to claim 1, further comprising the step of:

compensating for a variation in the thickness of each layer prior to depositing the subsequent layer.

7. A method according to claim 6, wherein said step of compensating comprises the steps of:

comparing the height of the last deposited layer with a reference level;

calculating the variation from said reference level;

adjusting the dispensing of said interface material from each of said plurality of nozzles.

8. A method according to claim 7, wherein said step of comparing comprises the step of:

building up a reference wall by selectively dispensing interface material from all of said plurality of nozzles, said reference wall comprising a plurality of reference layers, each of said plurality of reference layers being deposited in the process of depositing said corresponding model layers.

* * * * *

UNITED STATES PATENT AND TRADEMARK OFFICE
CERTIFICATE OF CORRECTION

PATENT NO.    : 6,259,962 B1
DATED         : July 10, 2001
INVENTOR(S)   : Gothait, Hanan It is certified that error appears in the above-identified patent and that said Letters Patent is hereby corrected as shown below:

<u>Title page,</u>
Item [22], under "filed", please change to -- March 1, 1999. --

Signed and Sealed this

Fourteenth Day of May, 2002

Attest:

JAMES E. ROGAN
*Attesting Officer*        *Director of the United States Patent and Trademark Office*